(12) United States Patent
Rabie et al.

(10) Patent No.: US 8,312,145 B2
(45) Date of Patent: Nov. 13, 2012

(54) TRAFFIC ENGINEERING AND BANDWIDTH MANAGEMENT OF BUNDLED LINKS

(75) Inventors: Sameh Rabie, Kanata (CA); Tong Shan, Ottawa (CA)

(73) Assignee: Rockstar Consortium US L.P., New York, NY (US)

( * ) Notice: Subject to any disclaimer, the term of this patent is extended or adjusted under 35 U.S.C. 154(b) by 2636 days.

(21) Appl. No.: 10/740,763

(22) Filed: Dec. 22, 2003

(65) Prior Publication Data

US 2005/0160171 A1    Jul. 21, 2005

(51) Int. Cl.
*G06F 15/16* (2006.01)
*G06F 15/173* (2006.01)

(52) U.S. Cl. ......... 709/227; 709/228; 709/229; 709/238
(58) Field of Classification Search .................... 709/227
See application file for complete search history.

(56) References Cited

U.S. PATENT DOCUMENTS

| | | | | |
|---|---|---|---|---|
| 5,970,064 A * | 10/1999 | Clark et al. | ................... | 370/351 |
| 5,999,517 A * | 12/1999 | Koning et al. | ................ | 370/255 |
| 6,044,075 A * | 3/2000 | Le Boudec et al. | ........... | 370/351 |
| 6,189,033 B1 * | 2/2001 | Jin et al. | ........................ | 709/225 |
| 6,363,319 B1 * | 3/2002 | Hsu | ............................... | 701/202 |
| 6,366,559 B1 * | 4/2002 | Krishnan et al. | ............. | 370/230 |
| 6,385,462 B1 * | 5/2002 | Baum et al. | .................... | 455/522 |
| 6,493,317 B1 * | 12/2002 | Ma | ................................. | 370/237 |
| 6,665,264 B1 * | 12/2003 | Davison et al. | ............... | 370/230 |
| 6,678,245 B1 * | 1/2004 | Cooper et al. | ................ | 370/230 |
| 6,724,722 B1 * | 4/2004 | Wang et al. | .................... | 370/229 |
| 6,778,495 B1 * | 8/2004 | Blair | ............................. | 370/230 |
| 6,778,531 B1 * | 8/2004 | Kodialam et al. | ............. | 370/390 |
| 6,820,133 B1 * | 11/2004 | Grove et al. | ................... | 709/238 |
| 6,895,441 B1 * | 5/2005 | Shabtay et al. | ................ | 709/238 |
| 7,002,963 B1 * | 2/2006 | Buyukkoc et al. | .......... | 370/395.1 |
| 7,082,102 B1 * | 7/2006 | Wright | .......................... | 370/351 |
| 7,180,866 B1 * | 2/2007 | Chartre et al. | ................ | 370/242 |
| 7,184,402 B1 * | 2/2007 | Sharma et al. | ................ | 370/232 |
| 7,230,918 B1 * | 6/2007 | Maiya et al. | ................... | 370/229 |
| 7,260,060 B1 * | 8/2007 | Abaye et al. | ................... | 370/230 |
| 7,366,133 B1 * | 4/2008 | Majidi-Ahy et al. | ......... | 370/329 |
| 2002/0002577 A1 * | 1/2002 | Garg et al. | ..................... | 709/104 |
| 2002/0119783 A1 * | 8/2002 | Bourlas et al. | ................ | 455/453 |
| 2002/0120768 A1 * | 8/2002 | Kirby et al. | .................... | 709/235 |
| 2002/0141345 A1 * | 10/2002 | Szviatovszki et al. | ........ | 370/238 |
| 2002/0147706 A1 * | 10/2002 | Burnett | ............................ | 707/3 |
| 2002/0147801 A1 * | 10/2002 | Gullotta et al. | ............... | 709/223 |
| 2002/0181464 A1 * | 12/2002 | Tsuchiya et al. | ............... | 370/392 |
| 2002/0191539 A1 * | 12/2002 | Rawlins et al. | ............... | 370/229 |
| 2003/0028670 A1 * | 2/2003 | Lee et al. | ....................... | 709/241 |

(Continued)

OTHER PUBLICATIONS

A. Moore, Measurement-Based Management of Network Resources, PhD Thesis, University of Cambridge, Jun. 2001.*

(Continued)

*Primary Examiner* — David Lazaro
*Assistant Examiner* — Robert Shaw (57) ABSTRACT

Traffic engineering and bandwidth management of bundled links may, at times, require the selection of one of a plurality of component links in a bundled link to use in admitting a connection requiring admission. While performing the selection it may be determined that more than one of the component links has the resources required to admit the connection. An admission policy may then be selected from among a plurality of admission policies. Based on the selected admission policy, a particular component link may then be selected. Such bandwidth management, based on admission policies, may be seen to be well suited to balancing and component link recovery in traffic engineered, connection-oriented MPLS networks.

9 Claims, 6 Drawing Sheets

U.S. PATENT DOCUMENTS

| | | | | |
|---|---|---|---|---|
| 2003/0103510 | A1* | 6/2003 | Svanberg et al. | 370/395.2 |
| 2003/0185153 | A1* | 10/2003 | Kohler et al. | 370/230 |
| 2003/0185217 | A1* | 10/2003 | Ganti et al. | 370/395.5 |
| 2003/0229713 | A1* | 12/2003 | Hensbergen et al. | 709/239 |
| 2003/0235209 | A1* | 12/2003 | Garg et al. | 370/468 |
| 2003/0236745 | A1* | 12/2003 | Hartsell et al. | 705/40 |
| 2004/0013089 | A1* | 1/2004 | Taneja et al. | 370/235 |
| 2004/0022277 | A1* | 2/2004 | Waild et al. | 370/536 |
| 2004/0049595 | A1* | 3/2004 | Sun et al. | 709/238 |
| 2004/0073650 | A1* | 4/2004 | Nakamura | 709/223 |
| 2004/0106405 | A1* | 6/2004 | Gabriel et al. | 455/435.1 |
| 2004/0114569 | A1* | 6/2004 | Naden et al. | 370/351 |
| 2004/0162905 | A1* | 8/2004 | Griffin et al. | 709/229 |
| 2004/0170125 | A1* | 9/2004 | O'Neill | 370/230 |
| 2004/0205239 | A1* | 10/2004 | Doshi et al. | 709/241 |
| 2004/0267965 | A1* | 12/2004 | Vasudevan et al. | 709/250 |
| 2005/0008014 | A1* | 1/2005 | Mitra et al. | 370/392 |
| 2005/0027840 | A1* | 2/2005 | Theobold et al. | 709/223 |
| 2005/0080759 | A1* | 4/2005 | Brown et al. | 707/1 |
| 2005/0083928 | A1* | 4/2005 | Sivabalan et al. | 370/389 |

OTHER PUBLICATIONS

Sivabalan et al., Link Bundling support for Diff-Sery aware Traffic Engineering, Mar. 2003.*

LeFaucheuer & Lai, Requirements for Support of Differentiated Services-aware MPLS Traffic Engineering, Jul. 2003.*

Blake et al., An Architecture for Differentiated Services, RFC 2475 (Dec. 1998).*

Awduche et al, Requirements for Traffic Engineering Over MPLS, RFC 2702 (Sep. 1999).*

Yavatkar et al., A Framework for Policy-based Admission Control, RFC 2753, (Jan. 2000).*

Bernet et al., A Framework for Integrated Services Operation over Diffsery Networks, RFC 2998 (Nov. 2000).*

Awduche et al., RSVP-TE: Extensions to RSVP for LSP Tunnels, RFC 3209, (Dec. 2001).*

LeFaucheuer & Lai, Requirements for Support of Differentiated Services-aware MPLS Traffic Engineering, RFC 3564 (Jul. 2003).*

Spall, An Overview of the Simultaneous Perturbation Method for Efficient Optimization, Johns Hopkins APL Technical Digest, vol. 19, No. 4 (1998), pp. 482-492.*

Sivabalan et al., Link Bundling support for Diff-Sery aware Traffic Engineering, (draft-sivabalan-diff-te-bundling.txt), IETF, Mar. 2003.*

Le Faucheur et al—MPLS Support of Differentiated Services, draft-ietf-mpls-diff-ext-09.txt, IETF (Apr. 2001).*

J. Moy, "OSPF Version 2", Internet Engineering Task Force (IETF) Request for Comments (RFC) 2328, Apr. 1998.

R. Callon, et al, "A Framework for Multiprotocol Label Switching", IETF Internet draft (work in progress), draft-ietf-mpls-framework-02.txt, Nov. 1997.

E. Rosen, et al, "Multiprotocol Label Switching Architecture", IETF Internet draft (work in progress), draft-ietf-mpls-arch-02.txt, Jul. 1998.

Blake, S., et. al., "An Architecture for Differentiated Services", IETF RFC 2475, Dec. 1998.

Le Faucheur et al., MPLS Support of Differentiated Services, IETF Internet Draft, draft-ietf-mpls-diff-ext-08.txt, Feb. 2001.

K. Kompella, Y. Rekhter, L. Berger, "Link bundling in MPLS traffic engineering", IETF Internet draft, draft-ietf-mpls-bundle-04.txt, Jan. 2003.

Le Faucheur, et al, "Requirements for support of Diff-Serv-aware MPLS Traffic Engineering", IETF Internet draft, draft-ietf-tewg-diff-te-reqts-07.txt, Feb. 2003.

Le Faucheur, et al, "Protocol extensions for support of Diff-Serv-aware MPLS Traffic Engineering", IETF Internet draft, draft-ietf-tewg-diff-te-proto-04.txt, Jun. 2003.

S. Sivabalan, F. Le Faucheur, R. Zhang, "Link Bundling support for Diff-Serv aware Traffic Engineering", IETF Internet draft, draft-sivabalan-diff-te-bundling-02.txt, Jun. 2003.

Le Faucheur et al., "Requirements for Support of Differentiated Services-aware Traffic Engineering", IETF RFC 3564, Jul. 2003.

Law, R. and Raghavan, S., DiffSery and MPLS—Concepts and Simulation, (http://www.ee.vt.edu/~ldasilva/6504/diffserv_mpls_report_final.pdf).

Awduche, D. et al., "Requirements for Traffic Engineering Over MPLS", IETF RFC 2702, Sep. 1999.

Awduche, D. et al., "RSVP-TE: Extensions to RSVP for LSP Tunnels" IETF, RFC 3209, Dec. 2001.

* cited by examiner

TRAFFIC ENGINEERING AND BANDWIDTH MANAGEMENT OF BUNDLED LINKS

FIELD OF THE INVENTION

The present invention relates to management of bundled links in data communication systems and, in particular, to traffic engineering and bandwidth management of such bundled links.

BACKGROUND

In data communication, a network that connects a source node to a destination node may be said to include routers and links between the routers. Routers typically communicate, by way of the links, using a data communication protocol specific to the network, where different protocols are used to communicate for different purposes. A particular data communication protocol may be chosen for a network so as to optimize a particular parameter such as cost, delay or bandwidth. The Internet Protocol (IP) is one of the data communication protocols commonly used in networks. Other data communication protocols commonly used in networks include Asynchronous Transfer Mode (ATM), Synchronous Optical Network (SONET) and Synchronous Digital Hierarchy (SDH). Even within different protocol types (IP, Ethernet, ATM, SONET, etc.), there may be different service categories (for IP telephony, virtual private networks, etc.) with different Quality of Service (QoS) requirements (cost, delay, bandwidth, etc.).

In addition to data communication protocols, networks may make use of routing protocols and other technologies that allow the determination of a path for a Protocol Data Unit (PDU) to take through a network. One commonly used routing protocol is known as Open Shortest Path First (OSPF) and a technology for speeding up network traffic flow and making network traffic easier to manage is Multi-Protocol Label Switching (MPLS).

OSPF is an Internet routing protocol described in J. Moy, "OSPF Version 2", Internet Engineering Task Force (IETF) Request for Comments (RFC) 2328, April 1998 and is classified as an Interior Gateway Protocol. This classification means that OSPF governs the distribution of routing information between routers in a given network. The OSPF protocol is based on link state information, where the state of a link may include cost, typical delay and available bandwidth. As such, OSPF is called a link state routing protocol. Each router in a given network using OSPF maintains an identical database describing the topology of the given network, i.e., which routers have links to which other routers and the state and qualities of those links. From resource information in the topology database, a routing table may be calculated. A routing table stores a "shortest" path from each node to each other node, which may not be shortest geographically, but may optimize one or more parameters.

Upon receiving a PDU, a router may examine the PDU to extract an address of a destination node. The router then consults the routing table to determine the next router in the shortest path to the destination node and transmits the PDU to the determined next router. In response to a topology change, e.g. a link failure, a router connected to the failed link originates a message called a Link State Advertisement (LSA) that is sent to all other routers in the given network. Each router, upon receiving a LSA, may then alter the topology database to reflect the advertised topological change and, subsequently, recalculate the local routing table based on the altered topology database. A router using the OSPF protocol may recalculate the local routing table quickly in the face of such topology changes, utilizing minimal routing protocol traffic.

MPLS is a technology for speeding up network traffic flow and increasing the ease with which network traffic flow is managed. A path between a given source node and a destination node may be predetermined at the source node. The routers along the predetermined path are then informed of the next router in the path through a message sent by the source node to each router in the predetermined path. Each router in the path associates a label with a mapping of output to the next router in the path. Accordingly, a router in an MPLS network may be called a Label Switched Router (LSR). By including, at the source node, the label in a label header associated with each PDU sent to the destination node, time is saved that would be otherwise needed for a router to determine the address of the next router to which to forward a PDU. The path arranged in this way is called a Label Switched Path (LSP). MPLS is called multiprotocol because it works with many protocols including IP, ATM and Frame Relay network protocols. An overview of MPLS is provided in R. Callon, et al, "A Framework for Multiprotocol Label Switching", IETF Internet draft (work in progress), draft-ietf-mpls-framework-02.txt, November 1997, and a proposed architecture is provided in E. Rosen, et al, "Multiprotocol Label Switching Architecture", IETF Internet draft (work in progress), draft-ietf-mpls-arch-02.txt, July 1998. (both documents are available at www.ietf.org)

In practice, a given LSR may receive a connection request, that is, a request that a path be built, from the given LSR to a specified destination LSR, for a stream of data to come. The given LSR determines a shortest path and sends a message to each LSR along the determined shortest path to build a virtual path for the stream of data. PDUs in the stream of data are associated with a label header that, when read by a LSR, assists the selection of the link to the next LSR in the virtual path.

In addition to moving traffic faster overall than IP, MPLS simplifies management of a network for QoS. Management of QoS relates to the aforementioned parameters of a link (cost, delay, bandwidth, etc.) or a path made up of several links. Before a source node may send a message informing routers, in a determined path through a network, of a label to associate with a next router, a negotiation may take place between the source node and each of the routers controlling links along the determined path. The negotiation may determine, for instance, whether the resources associated with each of the links along the determined path are sufficient to meet the QoS requirements of the stream of data for which the path is being set up.

Differentiated Services, or "Diff-Serv", is described in Blake, S., et. al., "An Architecture for Differentiated Services", IETF RFC 2475, December 1998, which may be found at www.ietf.org, and provides scalable and "better than best-effort" QoS. Routers that are aware of Diff-Serv are stateless and do not keep track of individual flows of traffic. As such, Diff-Serv is eligible for deployment in the Internet. A Diff-Serv Code Point (DSCP) is placed in a Differentiated Services (DS) field of the IP header of an IP packet to identify a Per Hop Behavior (PHB) to associate with the IP packet. PHB is typically used to specify queuing, scheduling and drop precedence. There are several defined PHBs including: (i) Best effort, (ii) Assured Forwarding (AF), and (iii) Expedited Forwarding (EF). At the ingress node in a Diff-Serv domain, a DSCP value is determined based on a classification of the incoming packet. At the interior nodes, the PHB is determined from the DSCP and appropriate QoS treatment is applied to the packet.

The MPLS label header has an experimental use field (EXP field) that has been proposed for use in providing support for Diff-Serv in MPLS. However, there are two basic problems for MPLS support of Diff-Serv. First, the DSCP is carried in a packet header, but the LSRs only examine the label header. Second, the DSCP has six bits but the EXP field has only three bits. There are two solutions defined in F. Le Faucheur et al., MPLS Support of Differentiated Services, IETF Internet Draft, draft-ietf-mpls-diff-ext-08.txt, February 2001, to remedy these two problems: (i) EXP-Inferred-PSC LSP (E-LSP), and (ii) Label-Only-Inferred-PSC LSP (L-LSP). PSC refers to a "PHB Scheduling Class", which is a PHB group for which a common constraint is that ordering of at least those packets belonging to the same flow must be preserved.

For a E-LSP, an EXP-to-PHB mapping can be either pre-configured or explicitly signaled during the establishment of the E-LSP. An LSR receiving an incoming packet determines the PHB to be applied to the incoming packet by looking up the EXP field in the EXP-to-PHB mapping. For an L-LSP, an EXP-to-PHB mapping is a function of the PSC carried on the L-LSP, and is set up during the establishment of the L-LSP. Therefore, the PSC (i.e., used in queuing and scheduling) may already be known to the LSR based on the Label field. An LSR receiving an incoming packet determines the drop precedence, hence the PHB, to be applied to the incoming packet by looking up the EXP field in the EXP-to-PHB mapping.

Using the above protocols, or variants thereof, a source node in a network may dynamically provision resources within the network to establish or reconfigure a path through the network.

Traffic engineering (TE) is the process of selecting a path for routing a given connection (e.g., over an LSP) from a source node to a destination node such that the path satisfies constraints (bandwidth/administrative requirements) of the given connection, while simultaneously optimizing the network resource utilization and avoiding congestion. In classical TE, network traffic is distributed and link bandwidth is managed on an aggregate basis, that is, the TE information (e.g., unreserved link bandwidth) is advertised aggregately.

Diff-Serv aware TE (DS-TE) was designed on top of classical TE and with a goal being the maintenance of a relative proportion of different traffic on each link. For example, DS-TE limits the amount of guaranteed traffic below a given percentage of link capacity, while non-guaranteed service can be engineered or overbooked to offer an acceptable but lower level of service. On each DS-TE link, one Bandwidth Constraint (BC) value is configured for each class type. TE parameters (bandwidth constraint and unreserved link bandwidth) are advertised on a per class basis.

The term "Class Type" (CT) may be used to refer to a set of traffic trunks crossing a link, where the set is governed by a specific set of bandwidth constraints. A TE class is a pair including a class type and a preemption priority allowed for that CT. When ordinary TE is performed in a network, there is only one CT and one TE class per link (assuming a single pre-emption priority). When the DS-TE is performed, there can be up to eight class types, and up to eight TE-classes per link.

As defined in K. Kompella, Y. Rekhter, L. Berger, "Link bundling in MPLS traffic engineering", IETF Internet draft, draft-ietf-mpls-bundle-04.txt, January 2003 (hereinafter "Kompella"), a TE bundled link is a logical entity that represents a group of physical and/or logical TE links connecting LSRs. The TE links making up a TE bundled link are called component links. As with ordinary TE links, TE parameters associated with a bundled TE link are advertised (e.g., via OSPF) to allow Constraint Based Routing. However, TE parameters for individual component links are not flooded. As such, an LSR that is not directly attached to a bundled link views that bundled link as a single link for path computation purposes.

As stated in Le Faucheur, et al, "Requirements for support of Diff-Serv-aware MPLS Traffic Engineering", IETF Internet draft, draft-ietf-tewg-diff-te-reqts-07.txt, February 2003, and Le Faucheur, et al, "Protocol extensions for support of Diff-Serv-aware MPLS Traffic Engineering", IETF Internet draft, draft-ietf-tewg-diff-te-proto-04.txt, June 2003, DS-TE provides the capability to engineer network traffic on a per "class" basis instead of on an aggregate basis. With DS-TE, admission control may be performed on a per class basis rather than on an aggregate basis, as with classical TE. Consequently, DS-TE requires that certain TE parameters are advertised on a per class basis. The hereinbefore-referenced draft-ietf-tewg-diff-te-proto-04.txt specifies how those TE parameters are advertised on a per class basis on non-bundled links. Kompella specifies how to derive TE parameters for a bundled link from those of its component links.

S. Sivabalan, F. Le Faucheur, R. Zhang, "Link Bundling support for Diff-Serv aware Traffic Engineering", Internet draft, June 2003, (hereinafter "Sivabalan") captures the relevant enhancements to Kompella so that the necessary TE parameters are advertised on a per-class basis for a TE bundled link. This allows DS-TE to be supported over bundled links.

Link bundling may be employed to improve routing scalability by reducing the amount of information handled by whichever link state advertising protocol is being used, such as the OSI Intermediate System-to-Intermediate System (IS-IS) and the IETF OSPF routing protocols, and their recent traffic engineering versions IS-IS-TE and OSPF-TE.

The benefits of link bundling include inadvertent load sharing among the component links as well as redundancy in the event that one or more of the component links in the bundled link fail. Additionally, link bundling allows incremental increases in capacity at finer granularity (e.g., allowing for a 6 Mbps "trunk" using four T1 links). The link bundling aspect of Ethernet LAG (Link Aggregation) is also receiving a strong industry interest for increasing capacity and survivability.

TE techniques and protocols can implement a variety of Bandwidth Constraint (BC) models, which control resource partitioning and sharing among the multiple class types (Bandwidth Pools) sharing the link. Examples of the BC models include the Maximum Allocation model and the Russian Doll Model.

Kompella and Sivabalan specify how to derive TE parameters for a given bundled link from the TE parameters of the component links of the given bundled link for network environments where the classical DS or DS-TE is performed, respectively. However, neither Kompella nor Sivabalan specify how to select a component link for accommodating a new connection request when more than one component link has enough unreserved bandwidth at the connection admission time. Although it is well known that load balancing is very important for improving QoS and achieving bandwidth usage efficiency, no load balancing scheme has yet been specified, and it has been left for the vendors to design an appropriate load balancing scheme. Similarly, neither Kompella nor Sivabalan specify how to recover connections upon the failure of one or multiple component links, and how to re-balance the traffic after the recovery from a component link failure.

Many vendors are known to use proprietary hashing algorithms to perform load balancing. These hashing algorithms distribute incoming PDUs based on MAC address, IP address, port number, etc. However, different QoS requirements were not considered. Such techniques are suitable for connectionless traffic, where no bandwidth reservation is possible.

Some load balancing techniques have been implemented for Private Network-Network Interface (P-NNI) ATM networks. However, these techniques are somewhat limited in the methods they use, and may be shown not to lend themselves well to the MPLS-TE protocols and standards.

As well, Inverse Mux in ATM (IMA) uses bundled links in a different way than MPLS. In IMA, the cells from each connection are distributed evenly across all available links using hardware assist mechanisms. All component links share the load equally, and there is no visibility or variability of BW utilization for the component links.

Clearly, an improvement is required in traffic engineering and bandwidth management of bundled links. Of particular interest would be methods that lend themselves well to the MPLS-TE protocols and standards.

SUMMARY

Traffic engineering and bandwidth management of bundled links may be performed according to one or more admission policies, thereby allowing for such improvements as load balancing for the bundled link. Advantageously, the admission policies may incorporate traffic balancing mechanisms so that not only the load is balanced, but also the use of component links by connections associated with different applications, different qualities of service and different class types. Additionally, such bandwidth management, based on admission policies, may be seen to be well suited to balancing and component link recovery in traffic engineered, connection-oriented MPLS networks.

In accordance with an aspect of the present invention there is provided a method of selecting one of a plurality of component links in a bundled link for use in admitting a connection requiring admission. The method includes receiving an indication of resources required by the connection requiring admission, determining that the resources required are available on more than one of the component links, selecting a given admission policy from a plurality of admission policies and selecting a particular component link from the more than one of the component links based on the given admission policy. In additional aspects of the invention, a router is provided adapted to carry out the method and a computer readable medium is provided to allow a processor in a router to carry out the method.

In accordance with an aspect of the present invention there is provided a method of recovering a connection affected by a failure of a component link in a plurality of component links in a bundled link. The method includes selecting a candidate connection that has been affected by the failure, determining resources required by the candidate connection and determining that the resources required are available on more than one of the component links. The method further includes selecting a given admission policy from a plurality of admission policies and selecting a particular component link from the more than one of the component links based on the given admission policy. In additional aspects of the invention, a router is provided adapted to carry out the method and a computer readable medium is provided to allow a processor in a router to carry out the method.

In accordance with an aspect of the present invention there is provided a method of traffic rebalancing after an addition of a given component link to a bundled link that includes a plurality of component links. The method includes determining whether an optimization policy is to be employed and, if an optimization policy is to be employed, determining an associated optimization index for each of the component links according to the optimization policy. The method further includes selecting a candidate component link from among the component links based on the associated optimization index, selecting a candidate connection on the candidate component link and relocating the candidate connection to another component link among the component links.

In accordance with an aspect of the present invention there is provided a method of optimizing use of a plurality of component links of a bundled link. The method includes determining an associated optimization index for each of the component links, selecting a candidate component link from among the component links based on the associated optimization index, selecting a candidate connection on the candidate component link and relocating the candidate connection to another component link among the component links. In additional aspects of the invention, a router is provided adapted to carry out the method and a computer readable medium is provided to allow a processor in a router to carry out the method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
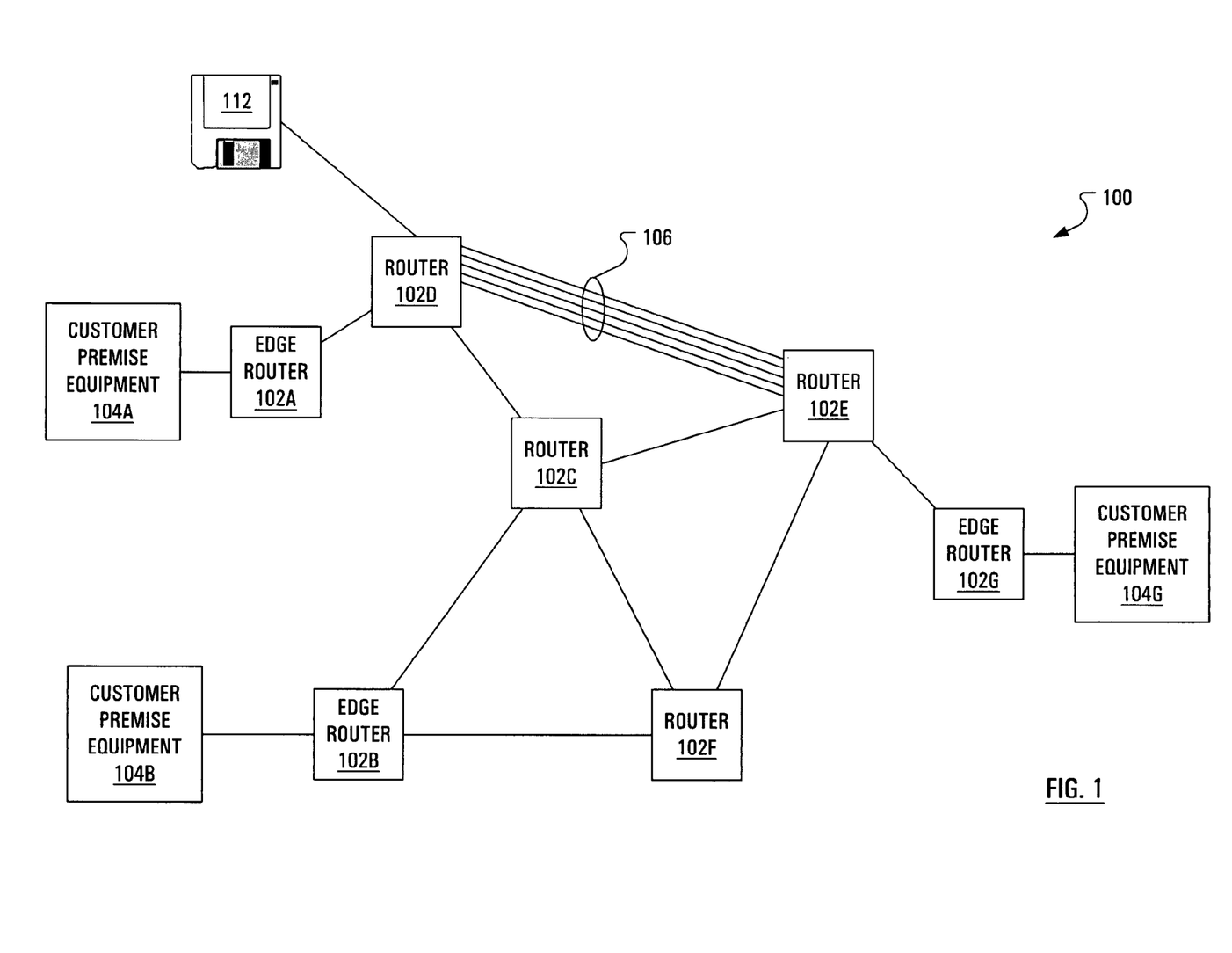
FIG. 1 illustrates an exemplary network that includes a plurality of routers, two of which routers are connected by a bundled link.

FIG. 1 illustrates an exemplary network 100 that includes a plurality of routers 102A, 102B, 102C, 102D, 102E, 102F, 102G (collectively or individually 102) connected by links. Particular ones 102A, 102B, 102G of the routers are identified specifically as edge routers, as the edge routers connect to customer premise equipment 104A, 104B, 104G. As is typical, each router includes a processor, some memory and a number of ports for connecting to links that allow communication between the routers 102.

Five parallel links connect a router D 102D and a router E 102E and may be configured as a bundled link 106. As such, a link state advertisement protocol such as OSPF/IS-IS only advertises the Traffic Engineering (TE) parameters of the bundled link 106, rather than advertising the TE parameters of each of the five component links. The TE parameters may include, for example, unreserved bandwidth at a priority p and maximum Label Switched Path (LSP) bandwidth at the priority p.

The router D 102D may be loaded with component link selection software for executing methods exemplary of this invention from a software medium 112 which could be a disk, a tape, a chip or a random access memory containing a file downloaded from a remote source.

It has been recognized as important to design a good traffic balancing mechanism to distribute traffic connections among component links. In a Multi-Protocol Label Switching (MPLS) network, where good traffic balancing mechanisms are not in place, bandwidth use may be fragmented and the maximum LSP bandwidth of the bundled link 106 may be reduced such that a new big connection can not fit into any component link. As a result, potentially fewer connections are admitted and bandwidth efficiency may be observed to be lessened.

Each MPLS Label-Only-Inferred-PSC LSP (L-LSP) has one bandwidth parameter, one Class Type (CT) and one QoS requirement. An L-LSP must only employ one component link in a bundled link to preserve frames ordering.

Each MPLS EXP-Inferred-PSC LSP (E-LSP) has one bandwidth parameter, one CT, but multiple QoS requirements. An E-LSP employs a single component link in a bundled link, according to MPLS-TE principles.

Upon the failure of one or more component links, some or all of the connections employing the failed component link may be restored, by allocating the connections to the surviving links. It has been recognized as important to consider traffic balancing in the restoration of connections formerly employing a failed component link.

In overview, the selection of a component link within a bundled link in which to admit a particular connection is performed according to one or more admission policies. The use of admission policies for this selection allows for the balancing of traffic across a bundle of component links and/or connections. In particular, in networks where the bundled links and/or connections are deployed (e.g., Ethernet Link Aggregation (LAG) and MPLS over ATM), upon receiving a connection establishment request, a router needs to decide which component link (of several component links having enough unreserved bandwidth) should be selected for accommodating the new connection represented by the connection establishment request. A set of load balancing mechanisms and policies are proposed herein for intelligently selecting a component link. The mechanisms and policies are designed to take into consideration not only the bandwidth that is available on the links and/or requested by the connections but also the QoS parameters and class types that are supported by the links and/or requested by the connection.

The use of admission policies for this selection also allows for organized connection recovery upon the failure of a component link in a bundled link. In networks where the bundled links and/or connections are deployed, many connections may be affected in the case of a component link failure. Methods for recovering connections are presented herein, which methods take into consideration the QoS requirements of affected connections and the available bandwidth, supported QoS requirements and class types, etc. of the working component links of the bundled link.

Additionally, the use of admission policies for this selection allows for re-balancing of traffic load on a bundled link after the recovery of a failed component link or the addition of a new component links. In networks where the bundled links and/or connections are deployed, mechanisms are presented herein for re-balancing the traffic on the bundled link after the component link failure is recovered. The re-balancing considers not only the bandwidth of the newly working component link and traffic load of the ongoing connections, but also the CTs and QoS demands.

Furthermore, for networks where the bundled links and/or connections are deployed, methods are presented herein for globally optimizing the load carried by multiple bundled links.

The discussion hereinafter of details of intelligent component link selection is simplified by the following set of assumptions.

It is assumed that all component links in a given bundled link begin and end on the same pair of nodes, have the same traffic engineering metric (e.g., delay, cost, etc.), and have the same set of resource classes at each end of the links. However, the component links are not limited to the same type of link layer and/or physical layer protocols, i.e., a bundled link may be formed of a mixture of component links that use protocols as diverse as Packet over SONET, Ethernet, time division multiplexing, etc.

It is assumed that each component link supports multiple QoS requirements and multiple CTs. It is further assumed that all component links in a given bundled link support the same set of QoS requirements, the same set of CTs, the same bandwidth constraint model and the same Bandwidth Constraint (BC) values for the same CTs.

It is also assumed that each connection established over the bundled link may have a single QoS requirement (e.g., MPLS L-LSPs) or multiple QoS requirements (MPLS E-LSPs). Furthermore, it is assumed that each LSP belongs to one CT and has one bandwidth parameter and that each connection may only be routed through a single component link.

Such assumptions are consistent with the current MPLS-TE standards. It should also be apparent that such assumptions are common practice associated with the use of bundled links.

Figure 2:
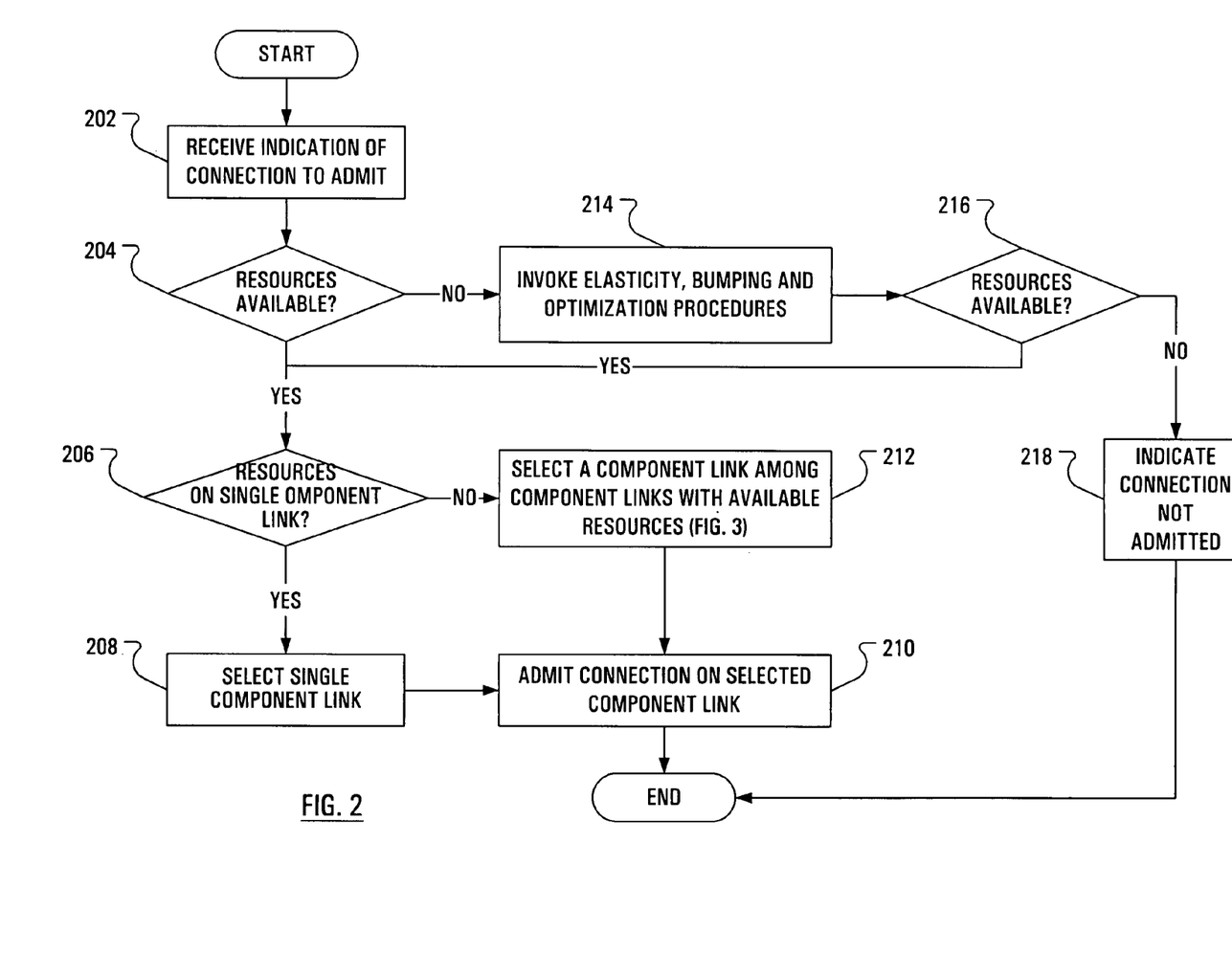
FIG. 2 illustrates steps of a connection admission method that may be performed at a router at one end of the bundled link of FIG. 1 according to an embodiment of the invention.

FIG. 2 illustrates steps of a connection admission method that may be performed at the router D 102D (FIG. 1) at one end of the bundled link 106. Initially, an indication of a connection requiring admission on the bundled link 106 is received (step 202). Such an indication may be a new connection request message or, as will be discussed in detail hereinafter, may be link relocation request arising perhaps from a need to relocate a connection that used a recently failed component link of the bundled link 106 or from a network optimization procedure.

After receiving such an indication, which would normally include information regarding required resources, a determination is made as to whether suitable resources are available on the bundled link 106 (step 204). If sufficient resources are determined to be available, it is determined whether the available resources are available on more than one component link (step 206). If only a single component link of the bundled link is determined to have sufficient resources, then that single component link is selected for admission of the indicated connection (step 208) and the indicated connection is admitted on the selected component link (step 210).

If multiple component links in the bundled link are determined to have sufficient resources, then one of the multiple component links is selected (step 212). The selection process is described in detail hereinafter in conjunction with a discussion of FIG. 3. The indicated connection is then admitted on the selected component link (step 210).

If sufficient resources are determined not to be available (step 204), elasticity, bumping and optimization procedures may be implemented (step 214). At the conclusion of such procedures, a second determination is made as to whether suitable resources are available on the bundled link 106 (step 216). If sufficient resources are determined to be available, it is determined whether the available resources are available on more than one component link (step 206). If sufficient resources are determined not to be available, even after the procedures of step 214, a message of non-admission of the connection is sent to the source of the indication of the connection requiring admission on the bundled link 106. Where the indication of a connection requiring admission on the bundled link 106 was a connection request, the message may take the form of a rejection of the connection request.

Figure 3:
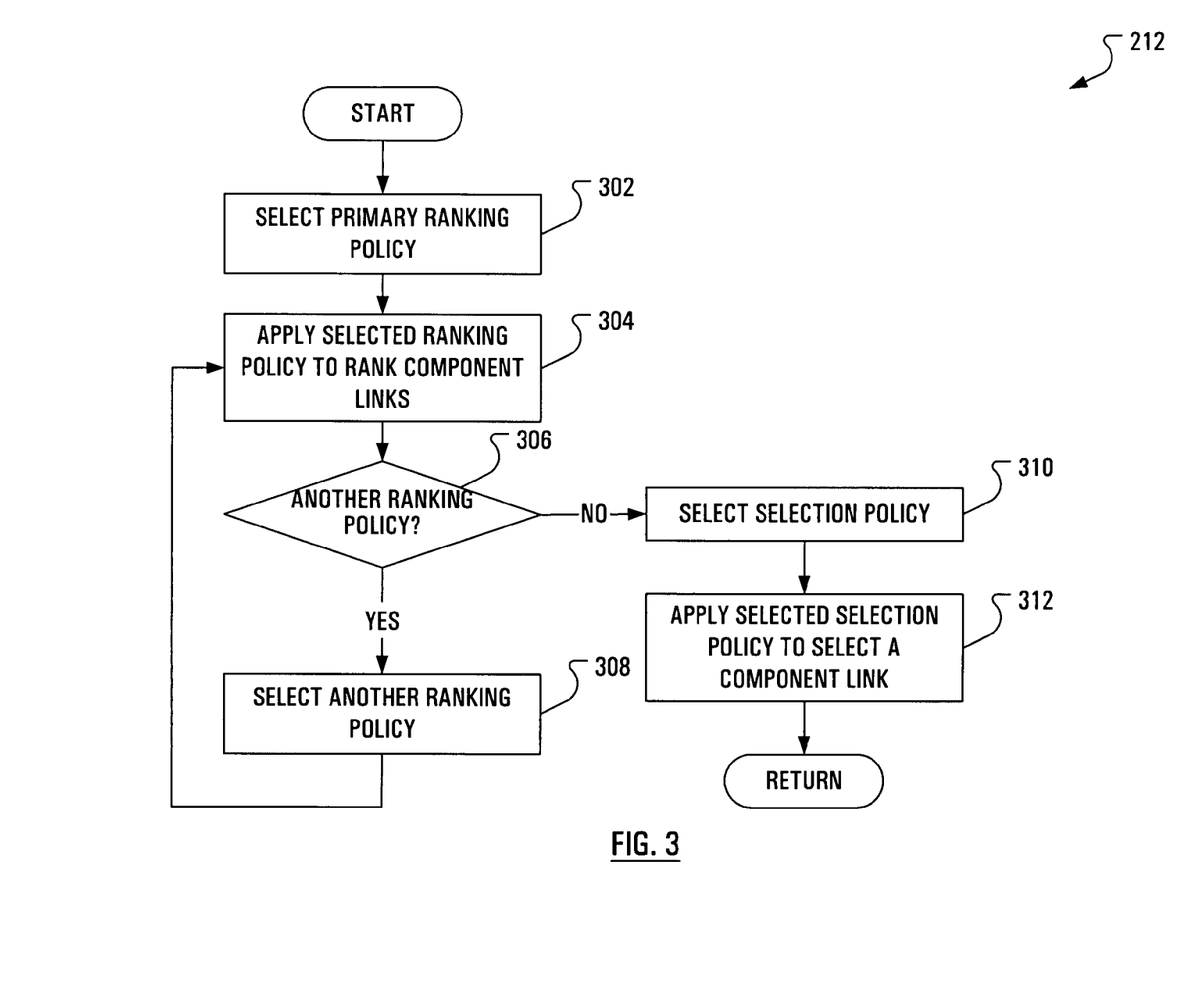
FIG. 3 illustrates steps of a component link selection process used in the connection admission method of FIG. 2 according to an embodiment of the invention.

Steps in the selection process of step 212 are presented in FIG. 3. Initially, a primary ranking policy is selected (step 302). The selected ranking policy is then applied (step 304) to rank the multiple component links in the bundled link that have been determined to have sufficient resources. It is then determined whether there are further ranking policies to be applied (step 306). If so, another ranking policy is selected (step 308) and applied (step 304). If not, a selection policy is selected (step 310). Such a selection policy determines which of the ranked component links is to be selected. A component link among the multiple component links in the bundled link that have been determined to have sufficient resources is then selected (step 312) according to the selection policy. Program control then returns to the main connection admission method of FIG. 2.

Many admission policies are contemplated, including those named herein as Maximum Unreserved Bandwidth, Best Fit, Random, Least Number Of Connections, Mix Long And Short-Term Connections, Median Unreserved Bandwidth, Equalize Traffic Mix And Measurement Based. These admission policies are discussed in further detail hereinafter and typically incorporate a ranking policy, a selection policy or both.

According to the Maximum Unreserved Bandwidth admission policy, when ordinary TE is performed, the component link with the maximum unreserved bandwidth, among the multiple component links in the bundled link that have been determined to have sufficient resources, is selected. When Diff-Serv aware TE (DS-TE) is performed, if there is more than one component link with enough unreserved bandwidth for the requested TE class, the component link with the maximum unreserved bandwidth for the requested TE class is selected. Advantageously, this admission policy is simple to use and results in an equalization of the bandwidth utilization of each component link, thereby improving QoS. However, use of this admission policy may lead to fragmented component link bandwidth, which causes inefficient bandwidth usage since a connection request for a new, big connection may not be accommodated by any single component link. In summary then, unreserved bandwidth is used to rank the component links highest-to-lowest and the top ranked component link is selected.

A variation of the above method may be used for DS-TE, whereby the total unreserved link bandwidth is used (as in ordinary TE) for ranking the component links regardless of the requested TE class. This variation focuses on equalizing the total utilization of each component link, to minimize congestion and improve QoS.

According to the Best Fit admission policy, when ordinary TE is performed, the component link having an unreserved bandwidth closest to the requested bandwidth, among the multiple component links in the bundled link that have been determined to have sufficient resources, is selected. That is, the component links may be said to be "packed". When the DS-TE is performed, if there is more than one component link with enough unreserved bandwidth for the requested TE class, the component link whose unreserved bandwidth for the requested TE class is the closest to the bandwidth that is requested is selected. Advantageously, component link bandwidth fragmentation is reduced. However, overall QoS may be reduced because some component links will be heavily utilized while others are underutilized. Additionally, susceptibility to congestion is increased. Such congestion may occur, for instance, if the actual traffic load on the admitted connection increases. Furthermore, restoration effort and delay may be increased, as a huge amount of traffic may be affected upon failure of a highly packed component link. In summary then, proximity of unreserved bandwidth to requested bandwidth is used to rank the component links closest-to-furthest and the top ranked component link is selected.

According to the Random admission policy, when ordinary TE is performed, a component link among the multiple component links in the bundled link that have been determined to have sufficient resources is selected randomly. When the DS-TE is performed, if there are more than one component links with enough unreserved bandwidth for the requested TE class, a component link is selected randomly. Advantageously, the Random admission policy is well suited to a scenario wherein actual traffic is unpredictable and cannot be well described by the reserved bandwidth amount. Additionally, the Random admission policy tends to equalize the traffic load on the component links, though not as well as the Maximum Unreserved Bandwidth admission policy. Unfortunately, component link bandwidth may become fragmented through use of the Random admission policy, thereby causing inefficient bandwidth usage. In summary then, the component links are not ranked and a component link is selected randomly.

According to the Least Number Of Connections admission policy, when ordinary TE is performed, the component link with the minimum number of connections among the multiple component links in the bundled link that have been determined to have sufficient resources is selected. When DS-TE is performed, if there is more than one component link with enough unreserved bandwidth for the requested TE class, the component link with the minimum number of connections is selected. Advantageously, the number of connections on each component link may be equalized, so as to equalize the recovery effort upon a component link failure. However, the Least Number Of Connections admission policy tends to fragment bandwidth in a manner similar to that of the Maximum Unreserved Bandwidth admission policy. The Least Number Of Connections admission policy is not as accurate as the Maximum Unreserved Bandwidth admission policy in distributing the load across all component links. In summary then, number of connections is used to rank the component links least-to-most and the top ranked component link is selected.

According to the Mixing Long And Short-Term Connections admission policy, when ordinary TE is performed, the component link with the least proportion or amount of bandwidth reserved by the requesting type of connection (long or short-term), among the multiple component links in the bundled link that have been determined to have sufficient resources, is selected. When the DS-TE is performed, if there is more than one component link with enough unreserved bandwidth for the requested TE class, the component link with the minimum percentage or amount of bandwidth reserved by the requesting connection type (short or long-term) is selected. Advantageously, the percentage/amount of bandwidth reserved by long and short-term connections may be equalized on each component link, so as to equalize impact of component link failure and the recovery effort, since long-term connections, e.g., Permanent Label Switched Paths (P-LSPs), have more predictable traffic, and are usually recovered first. In summary then, amount of unreserved bandwidth associated with the requesting type of connection is used to rank the component links most-to-least and the top ranked component link is selected.

Before the Mixing Long And Short-Term Connections admission policy may be applied, connections may be distinguished as either long-term or short-term. For example, a P-LSP may be considered to be a long-term connection, while a Switched LSP (S-LSP) may be considered to be a short-term connection.

Optionally, a percentage of bandwidth reserved by long (short) term connections may also be determined. For ordinary TE, determining such a percentage requires dividing a total bandwidth reserved for long (short)-term connections by component link capacity. For DS-TE, determining such a percentage requires dividing a total bandwidth reserved for long (short)-term connections of the ith class type by the ith bandwidth constraint. The latter determination, for instance, may rely on a maximum allocation model disclosed in Le Faucheur et al., "Requirements for Support of Differentiated Services-aware Traffic Engineering", IETF RFC 3564, July 2003, which may be found at www.ietf.org.

Recall that, when ordinary TE is performed, a priority p connection may be admitted if the required bandwidth is less than or equal to the maximum available bandwidth for an LSP at priority p. The maximum available bandwidth for an LSP at priority p for the bundled link is the maximum among the component links. When the DS-TE is performed, a connection of TE-class i is admitted if the required bandwidth is less than or equal to the maximum available bandwidth for an LSP of TE-class i. The maximum available bandwidth for an LSP of TE-class i is the maximum among the component links.

To improve the availability of the bundled link bandwidth, when there is more than one component link with enough unreserved bandwidth, selection of the component link with maximum available bandwidth should be avoided. On the other hand, selection of the link with the minimum available bandwidth should be avoided to avoid over-loading one link while under-loading others.

According to the Median Unreserved Bandwidth admission policy, neither the component link with the maximum available bandwidth nor the component link with the minimum available bandwidth are selected. Instead, the component links are sorted according to unreserved bandwidth and the component link having the median unreserved bandwidth is selected. Advantageously, the availability of the bundled link is improved and overloading of some links while under-loading others is avoided. In summary then, unreserved bandwidth is used to rank the component links and the median ranked component link is selected.

According to the Equalize traffic mix admission policy, an attempt is made to equalize the traffic mix across all links. Initially, an application type may be determined for all traffic classes sharing a given component link. The application type may be deduced by one of the following methods. Each application is assigned a different class type (bandwidth pool). This is only possible in DS-TE and only if the number of applications is less than or equal number of class-types. If more than one application share a CT, then applications can be recognized by a configured or signaled LSP parameter, such as LSP-ID (or ID-range), traffic or QoS parameters, etc. Alternatively, packets on the datapath may be snooped and application type may be deduced from packet header information, for example DiffServ Code Point, IP Address, TCP/UDP Protocol Type/Port number, etc. (TCP is the well known Transport Control Protocol, UDP is the well known User Datagram Protocol)

For example, one could measure a ratio of CT-1 reservations to CT-2 reservations and try to equalize the ratio across all links (to maintain same voice/data ratio on all links). Advantageously, QoS requirements of the priority classes (e.g., voice and priority data) may be improved through the use of the Equalize traffic mix admission policy because the volume of such priority classes would be limited to a fraction of link bandwidth. In summary then, the mix of applications, by traffic volumes, is used to rank the component links and the top ranked component link is selected.

In many of the above admission policies the bandwidth reserved for a particular CT on a given component link is considered when determining whether to admit a connection with a requested bandwidth. According to the Measurement based admission policy, actual measured CT bandwidth may be considered. Alternatively, or in conjunction with the consideration of actual measured CT bandwidth, actual measured connection bandwidth may be considered.

Additionally, the Measurement based admission policy may factor into consideration of an average queue length for queue for the requested QoS requirement at each component link. This average queue length measure may be used instead of, or in addition to, an average measured bandwidth, to provide an improved measure of congestion or traffic burstiness for a given component link.

The Measurement based admission policy may be found to be particularly useful when the reserved bandwidth is not known or does not accurately reflect actual usage. Advantageously, the Measurement based admission policy may be used for tuning an overbooking factor, thereby allowing the admission of fewer or more connections, while minimizing congestion and improving QoS.

The measurements should be taken over a predefined measurement period with an appropriately long duration to ensure that the measurements truly represent typical utilization of the component link. The measurements may be combined with the reserved bandwidth, to arrive at a more conservative hybrid utilization measure, which takes into consideration both reserved and actual historical usage.

As the Measurement based admission policy alters the representation of the currently available bandwidth on a component link, the policy can be used in conjunction with any of the previously described admission policies. In summary then, the Measurement based admission policy is not associated with a ranking policy or a selection policy, but alters the application of a ranking policy that is part of another admission policy by changing the values on which the rankings are based.

One of the admission policies described hereinbefore may be selected statically, through a configuration option, or dynamically, based on a measured state of the bundled link. Additionally or alternatively, multiple admission policies may be combined to break ties or to obtain the benefits of more than one admission policy. Furthermore, different admission policies can be selected for different class types or for different application types. The application of multiple policies may be performed iteratively, may be selected based on a threshold or may be selected based on a weight.

The iterative approach to the application of multiple admission policies may be based on a hierarchical application of the admission policies, with the most critical admission policy applied first, as a primary admission policy. A secondary admission policy (or policies) may be used for breaking ties, that is when the ranking policy associated with the primary admission policy results in more than one component link ranked in the position that would lead to selection according to the selection policy associated with the primary admission policy. The iterative approach to the application of multiple admission policies allows for optional deviation from a predetermined hierarchy, where such deviation may use user-specified heuristics.

A threshold-based approach to the application of multiple admission policies may be applied when there is more than one component link with enough unreserved bandwidth for a requested TE class. Where a characteristic of the requested connection, e.g., the requested bandwidth, is below a predetermined threshold, a first admission policy may be used and where the characteristic is above the predetermined threshold, a second admission policy may be used. Alternatively, the characteristics of the component links (e.g., unreserved bandwidth) may be used for selecting the admission policy.

In a first example, the Random admission policy may be used to randomly select one of three component links (with bandwidth available for the requested TE class) when the reserved bandwidth is below the predetermined threshold, otherwise the component link with the second maximum unreserved bandwidth for the requested TE class is selected according to the Median Unreserved Bandwidth admission policy. Advantageously, the first example has the benefit of both of the admission policies applied, that is, the approach equalizes the traffic load on the component links and reduces component link bandwidth fragmentation. Beneficially, large connections are given the priority to access large bandwidth pools, so as to avoid fragmenting bandwidth into small pieces. Additionally, large and small connections are distributed evenly on all the component links, leading to improved bundled link utilization.

In a second example, the Best Fit ranking policy may be used in conjunction with the Median Unreserved Bandwidth selection policy to select the component link whose unreserved bandwidth for the requested TE class is the second closest to the requested value when the requested bandwidth is below the predetermined threshold. Otherwise, i.e., if the requested bandwidth is larger than the predetermined threshold, the component links may be ranked by unreserved bandwidth and selected according to the Median Unreserved Bandwidth selection policy such that the component link with the second maximum unreserved bandwidth for the requested TE class is selected. Advantageously, the second example has the benefit of both the Maximum Unreserved Bandwidth admission policy and the Best Fit admission policy and overcomes the drawbacks of the former. That is, the second example of threshold-based admission policy combination reduces component link bandwidth fragmentation and equalizes bandwidth utilization of each component link. Furthermore, large and small connections are distributed evenly on all the component links, so that the bundled link utilization is improved.

The weight-based approach to the application of multiple admission policies may be applied when there are more than one component link with enough unreserved bandwidth for a requested TE class. Initially, different parameters may be assigned to different admission policies. In the weight-based approach, a weight is determined for each component link based on the chosen parameters and values of characteristics of each component link, where the characteristics are related to the parameters. The component link that maximizes the weight may then be selected.

For example, if the Maximum Unreserved Bandwidth admission policy is to be used in conjunction with the Measurement based admission policy, a weight may be determined for each component link with enough unreserved bandwidth for the requested TE class.

Such a weight may be determined by forming a first product of an unreserved bandwidth parameter (say, $a1$) and the unreserved bandwidth (say, UB) for the requested TE class (class i) on the first component link under consideration. Additionally, a second product may be formed of a measurement parameter (say, $a2$) and the measured available bandwidth (say, MAB) for the requested TE class (class i) on the first component link under consideration. The first and second product may then be summed to give the weight for the first component link. That is, $$\text{weight (link 1)} = (a1 \times \text{UB}[\text{link 1, class } i]) + (a2 \times \text{MAB}[\text{link 1, class } i]).$$

Such a determination may be repeated for other component links. The component link with the maximum weight may then be selected. Subsequently, the importance of unreserved bandwidth and measured available bandwidth of the component link may be flexibly adjusted by changing the values of the parameters. Advantageously, weight-based approach to the application of multiple admission policies has the benefit of more than one admission policy and allows for the flexible adjustment of the importance of multiple criteria.

It may be considered that the weight-based approach to the application of multiple admission policies may be considered an admission policy itself, with the determination of weights for component links being the ranking policy and the selection of the component link that maximizes the weight being the selection policy.

Step 214 of FIG. 2 introduces the implementation of elasticity, bumping and optimization procedures, if sufficient resources are determined not to be available to accommodate a connection request at a particular bundled link. Such procedures may be implemented if a new connection request cannot be accepted on any of the component links in the particular bundled link, depending on the network policy and the nature of the requesting application.

If the requested connection can tolerate lower QoS (e.g., lower bandwidth), the connection may be admitted at a lower value than requested. Many data applications are known to have an ability to operate in this "elastic" bandwidth mode. On the other hand, many multimedia applications (e.g., voice and video) cannot function properly if bandwidth is reduced The requested connection may, in some situations, "bump" (or preempt) existing connections that have lower priority. IETF Standards specify the bumping procedures and mechanisms. The methods described herein can be used for assisting with known bumping procedures and mechanisms. For example, the methods described herein may be used for breaking ties among multiple preemption candidate connections with equal priority (for improved load balancing), or for deciding in favor of bumping several small connections rather than a single large connection.

A local or global optimization may be triggered to make room for the requested connection. For example, a number of smaller connections using several component links may be relocated to a single component link to make room for a larger new connection.

The elasticity, bumping and optimization procedures can be combined in multiple ways. For example, the bandwidth of an elastic connection could be reduced to a minimum allowed amount, before bumping is attempted.

Figure 4:
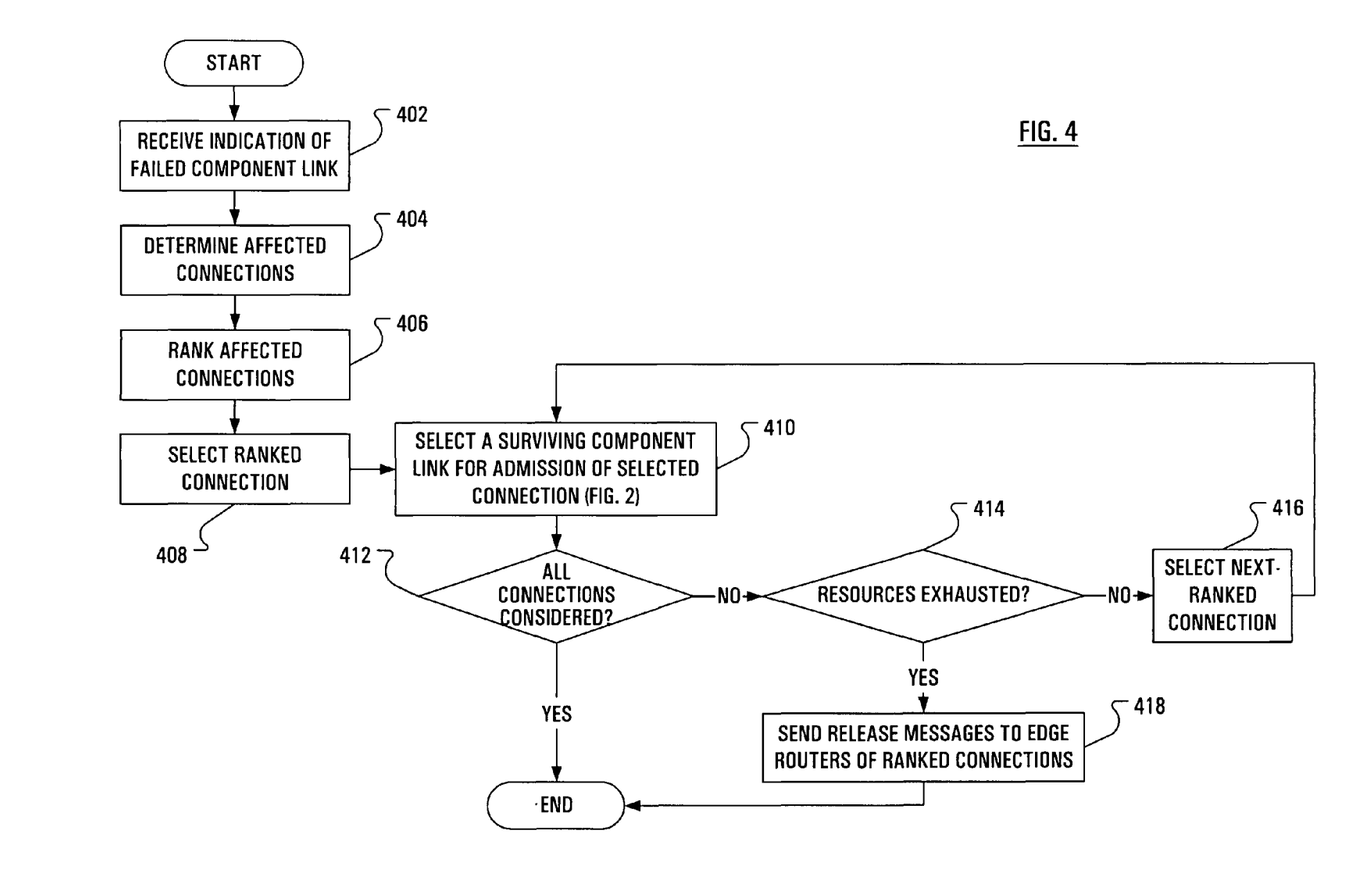
FIG. 4 illustrates steps in a method of handling a failure in a component link of a bundled link according to an embodiment of the present invention.

FIG. 4 illustrates steps in a method of handling a failure in a component link of a bundled link. At each end of the bundled link, a router initially receives indication (step 402) of failure of a component link. The router then determines the connections that are affected by the failure (step 404). The affected connections are then ranked (step 406) in a manner based on a network policy. One of the ranked connections is then selected (step 408) for relocating onto another (surviving) component link. A new component link is then selected (step 410) for admission of the selected connection. Notably, not all connections are necessarily candidates for relocation as some connections require user notification, and possible re-routing to another network path, because of the pending service disruption during the relocation time. The selection of the component link of step 410 has been described hereinbefore in conjunction with the discussion of FIG. 2.

Once a new component link has been selected to accommodate the relocated connection, it is determined whether there are further connections to relocate (step 412). If all connections to be relocated have been considered, the failure-handling method is complete. However, if there are further connections to be relocated, it is determined whether the resources on the bundled link are exhausted (step 414). If resources remain on the bundled link, the next-ranked connection is selected (step 416 and an attempt is made to select a component link to accommodate the selected connection (step 410). If no more resources remain on the bundled link, release messages are sent to the edge routers of the connections remaining to be relocated (step 418) and the failure-handling method is complete. Alternatively, a given connection remaining to be relocated may be terminated without sending signaling messages, if the given connection remaining to be relocated was "nailed-up" using network configuration.

The ranking of connections requiring recovery (step 406, FIG. 4) depends on network objectives, which may include connection importance, revenue maximization, efficiency maximization and operation simplicity.

Policies for ranking the connections to be redirected to the surviving component links include: connection importance methods such as those methods that are rerouting priority based or QoS/SLA requirement based; revenue maximization methods such as those methods that route connections based on their revenue; efficiency maximization methods such as those methods that route connections based on the size or resource usage of the connections; and operations simplicity and speed of recovery methods such as those methods that are connection-type based (e.g., P-LSP vs. S-LSP).

A first exemplary recovery policy is rerouting priority based. Rerouting priority is sometime referred to in the IETF standards as set-up priority, holding priority or pre-emption priority. According to the rerouting priority based recovery policy, connections requiring recovery may be ranked (step 406, FIG. 4) based on the rerouting priority of the connections. In implementation, the connections affected by a failure of a component link are considered for redirection to the remaining component links in an order that begins with the connections with the highest rerouting priority.

The rerouting priority associated with a given connection may be signaled or may be assigned according to local policies (see, for example, commonly assigned U.S. patent application Ser. No. 10/176,060 filed on Jun. 21, 2002).

Consider a first example, wherein a first MPLS path, "LSP#1", is signaled with higher rerouting priority than a second MPLS path, "LSP#2". Additionally, LSP#1 may be considered to belong to a given TE class. According to the rerouting priority based recovery policy, after the failure of a component link that carried both LSP#1 and LSP#2, LSP#1 is selected for recovery first (step 408, FIG. 4). A component link may then be selected (step 410, FIG. 4) for LSP#1 using the component link selection mechanisms presented hereinbefore (see FIG. 2). It may be that sufficient resources are unavailable to recover LSP#1, in which case LSP#1 will require routing through another path that does not include the bundled link. An indication of this requirement may be sent as a release message to the source edge router of LSP#1 (step 218, FIG. 2).

Advantageously, the rerouting priority based recovery policy provides faster recovery and a better route to the connections with higher rerouting priority than the connections with lower rerouting priority.

A second exemplary recovery policy is QoS requirement based. According to the QoS requirement based recovery policy, each connection may be ranked (step 406, FIG. 4) based on the QoS requirement of the connection, that is, the connections with the stringent QoS requirements are relocated first. For example, MPLS Expedited Forwarding (EF) LSPs are relocated before MPLS Assured Forwarding 1 (AF1) LSPs.

Consider a second example, wherein the LSP#1 is an EF LSP and LSP#2 is and AF1 LSP. Additionally, LSP#1 may be considered to belong to a given TE class. According to the QoS requirement based recovery policy, after the failure of a component link that carried both LSP#1 and LSP#2, LSP#1 is selected for recovery first (step 408, FIG. 4). A component link may then be selected (step 410, FIG. 4) for LSP#1 using the component link selection mechanisms presented hereinbefore (see FIG. 2). It may be that sufficient resources are unavailable to recover LSP#1, in which case LSP#1 will require routing through another path that does not include the bundled link. An indication of this requirement may be sent as a release message to the source edge router of LSP#1 (step 218, FIG. 2).

Advantageously, the connections with the most stringent QoS requirements receive faster recovery and better routes, if necessary.

A third exemplary recovery policy is connection type/permanence based. According to the connection type/permanence based recovery policy, each connection may be ranked (step 406, FIG. 4) based on the permanence of the connection, that is, permanent connections are relocated before switched connections. For example, a P-LSP is relocated before an S-LSP.

Permanent connections are set-up through network configuration, and usually last for a long time. Such permanent connections may require operator intervention for recovery after failure. On the other hand, switched connections are signaled by the Customer Equipment or edge routers, and can usually recover automatically. The connection type/permanence based recovery policy reroutes the permanent connections ahead of switched ones to minimize service disruptions and reduce operations load. Additionally, usually permanent connections are more valuable to the network/users than switched connections, require more stringent QoS and availability requirements, and generate higher revenues than switched connections Advantageously, more important connections receive faster recovery and operations loads may be reduced.

A fourth exemplary recovery policy is size/resource based. According to the size/resource based recovery policy, each connection may be ranked (step 406, FIG. 4) based on the size/resource utilization of the connection, that is, large connections (generally expressed in terms of resource utilization) are relocated before small connections.

Advantageously, relocating the largest connections first will usually result in tighter packing of the surviving links, which maximizes the bundled link utilization (and the amount of connections that can be relocated).

A fourth exemplary recovery policy is revenue based. According to the revenue based recovery policy, each connection may be ranked (step 406, FIG. 4) based on the revenue generated by the connection, that is, connections that generate the greatest amount of revenue are relocated before connections that generate lesser amounts of revenue. Often revenue is correlated with connection size and QoS commitment.

For example, the largest EF connections may be relocated first. Subsequently, smaller Expedited Forwarding (EF) connections or larger Assured Forwarding (AF) connections may be relocated depending on the revenue contribution associated with the connection.

Advantageously, revenue may be maximized. Additionally, connections that generate the highest revenue are likely to experience minimum disruption and best QoS, compared to other connections which may have to be rerouted to other less optimal network path or terminated.

In addition to recovery ranking policies as described hereinbefore, there may be several recovery options, including: preemption on the surviving links; and connection elasticity.

According to the preemption on the surviving links recovery option, which may be used in conjunction with any of the hereinbefore-described recovery policies, if a failed connection cannot be relocated to another component link because of resource unavailability, lower priority connections on the surviving component links may be preempted (bumped) to make room for connections with higher priority. Such preemption has been discussed hereinbefore in conjunction with the discussion of step 214 of FIG. 2.

Subsequent to preempting one or more connections to make room for a higher priority connection, rerouting of the preempted connections onto other component links may be attempted. If the attempt fails, release messages may be sent to the source edge routers of the connections. The source edge routers are then likely to attempt rerouting the preempted connections on other network paths.

Advantageously, the higher priority connections are recovered.

According to the connection elasticity recovery option, which may be used in conjunction with any of the described recovery policies, if the failed connection cannot be relocated to a surviving component link because of resource unavailability, one or more elastic connections (a connection capable of reducing bandwidth demand to a lower specified limit) among the connections on the surviving component links may be required to reduce bandwidth demand. Such bandwidth reduction may be required of either the connection to be recovered or one or more of the existing connections on the surviving links, or both, depending on the priority of the connections and established network policies.

In one implementation, the failure of one component link can be regarded as a bandwidth decrease on the bundled link. As described hereinbefore with respect to the recovery policies, the affected connections may be ranked (step 406, FIG. 4) in a manner consistent with the recovery policy in place. A connection to be relocated may be selected from the ranked connections (step 408). When the connection elasticity recovery option is used, one or more of the elastic connections on the surviving component links may be required to reduce the bandwidth demand (step 214, FIG. 2). The available bandwidth for the TE class of the connection to be relocated may then be reassessed (step 216, FIG. 2). It may be that sufficient resources are unavailable to recover the connection to be relocated, in which case the connection to be relocated will require routing through another path that does not include the bundled link. An indication of this requirement may be sent as a release message to the source edge router of connection to be relocated (step 218, FIG. 2).

Advantageously, more connections receive fast recovery by taking advantage of the connection elasticity of other connections.

Figure 5:
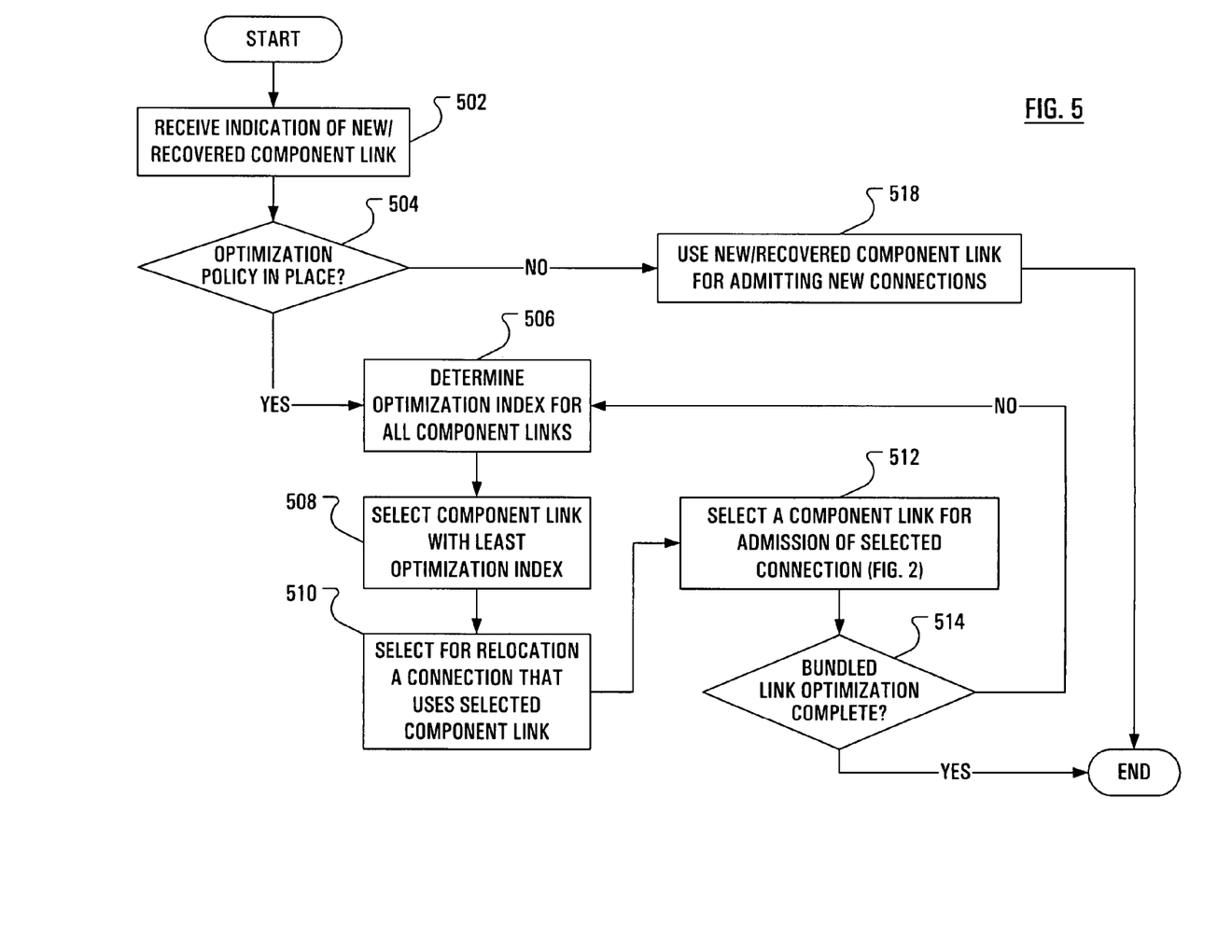
FIG. 5 illustrates steps in a method of adding a new component link or recovering a formerly failed component link according to an embodiment of the present invention.

Just as a component link in a bundled link may fail, a component link may recover. Additionally, new component links may be added to a bundled link. FIG. 5 illustrates steps in a method of adding a new component link or recovering a formerly failed component link. Hereinafter, "new component link" will be used to refer equally to a new component link in a bundled link or a recovered component link. Initially, an indication of the new component link is received (step 502). It is then determined whether an optimization policy is in place (step 504). If it is determined that an optimization policy is not in place, the new component link may be incorporated (step 518) immediately into the main connection admission method of FIG. 2.

If it is determined (step 504) that an optimization policy is in place, a TE-Optimization-Index may be determined for all component links in the bundled link (step 506).

The TE-Optimization-Index indicates a degree of deviation of a value of a TE metric associated with a component link from an optimum value of that TE metric. For example, depending on the characteristic being considered, a heavily congested (oversubscribed) component link, or a component link with mix of mostly voice and little data, may be determined to have a low TE-Optimization-Index. The determination of the TE-Optimization-Index may be influenced by a balancing policy implemented by the network.

Note also that a connection may be associated with a "relocation ability factor" that indicates ability/desirability of relocation.

The component link associated with the least TE-Optimization-Index is then selected (step 508). A connection that uses the selected component link is then selected for relocation (step 510). The selected connection is then relocated (step 512) using the main connection admission method of FIG. 2. It is then determined whether the optimization of the bundled link is complete (step 514). The bundled link optimization may be considered complete (step 514) once the TE-Optimization-Index of each component link is within a predetermined range, or if the next optimization cycle results in no change or improvement.

If it is determined that the optimization of the bundled link is incomplete, the TE-Optimization-Index is re-determined for all the component links of the bundled link (step 506). Of course, the determination of the TE-Optimization-Index may only be necessary for the selected component link and the component link that received the relocated connection. Subsequently, a least TE-Optimization-Index component link is selected (step 508) and a connection on the selected component link is selected for relocation (step 510) and relocated (step 512). If it is determined that optimization of the bundled link is complete, the method is complete.

The TE-Optimization-Index may be determined for each component link in a given bundled link to indicate a proximity of a TE metric to a predetermined "optimum" TE metric for the given bundled link. The TE-Optimization-Index may depend on, among other factors, the particular TE metric (e.g., utilization, traffic mix) associated with the component link and a load balancing method chosen for the given bundled link.

For example, consider three component links (first, second, third) that are targeted for relocating of connections. The first, second and third component links may be associated with a utilization TE metric of 70%, 50% and 30%, respectively.

Where a load balancing policy is in place, the TE-O-Index of the first, second and third component links may be expressed as 3, 5 and 7, respectively. Accordingly, the first component link may be selected (step 508) for connection relocation.

Where a fragmentation minimization policy is in place, the TE-O-Index of the first, second and third component links may be expressed as 7, 5 and 3, respectively. Accordingly, the third component link may be selected (step 508) for connection relocation.

Where a voice/data ratio minimization policy is in place and the voice/data ratios on the first, second and third component links are 2, 3 and 5, respectively, the TE-O-Index of the first, second and third component links may be expressed as 5, 3 and 2, respectively. Accordingly, the third component link may be selected (step 508) for connection relocation.

Policies may be combined. It may be that an optimization policy is implemented to attempt to provide load balancing while minimizing the voice/data ratio. Consider the first, second and third component links used in the examples hereinbefore, wherein the third component link has the lowest overall utilization and the highest voice/data ratio. Depending on the weight given to each TE metric in determining the TE-O-Index, the third component link may not have the greatest TE-O-Index, as was the case under the pure load balancing policy, or the least TE-O-Index, as was the case under the pure voice/data ratio minimization policy.

More complex optimization policies are possible. For example, the TE-O-Index may be determined from a consideration of all TE metrics available. The optimization policy may be designed to equalize the TE-O-Index across the bundled link. If the TE-O-Indices determined for the first, second and third component links are 1, 3 and 8, respectively, then the target TE-O-Index for each link may be determined as (1+3+8)/3=4. Accordingly, the first component link may be selected (step 508) for connection relocation until the associated TE-O-Index reaches 4. Once a component link is selected (step 508), the next step is to select a connection for relocation (step 510).

In one implementation, the connection that brings the TE-Optimization-Index of the selected component link closest to the "optimum" may be selected for relocation. For example, if the TE-Optimization-Index of the selected component link is low due to high link utilization, then the connection associated with the greatest contribution to that utilization may be selected for relocation. Alternatively, if the TE-Optimization-Index is low due to a high voice/data ratio, then a voice connection may be selected for relocation. Additionally, connection selection policies may be combined, e.g., among voice connections, the largest voice connection may be selected for relocation.

In another implementation, the connection selection policy may be based on a connection "relocation factor" assigned by network operator. This factor can be set based on QoS requirements, application type, customer, etc. Some connections can be easily moved without noticeable user impact (e.g., some data connections), whereas the relocation of other applications, such as high quality video, could be disruptive. Selection of a connection to relocate can be based on other factors such as connection importance/priority, resources use, size, revenue, etc.

Note that the connection relocation should never result in the termination of a connection. If a connection that is a candidate for relocation cannot be moved to a new component link for any reason, then the connection should be left in its original place. Preferably, make-before-break techniques may be used to ensure this continuity and also minimize relocation time/disruption. Lastly, the network should pace the relocation of connections to avoid an adverse impact on nodal computing resources.

Where the optimization executed in response to the addition of a new component link to a bundled link or recovery of a previously failed component link may be considered to be "local optimization", a "global optimization" is also contemplated. A global optimization procedure may be scheduled, to occur, say, during a period of low activity such as midnight or on a weekend. Alternatively, the global optimization procedure may be triggered by an event such as a failure to admit one or more new connections or the deterioration of a TE-Optimization-Index, etc. The conditions that lead to global optimization may configured by a network administrator.

The simple techniques used for local optimization may be adapted to global optimization. Alternatively, a more drastic measures may be taken that may result in the relocation of many connections and significant computation and service disruption.

Figure 6:
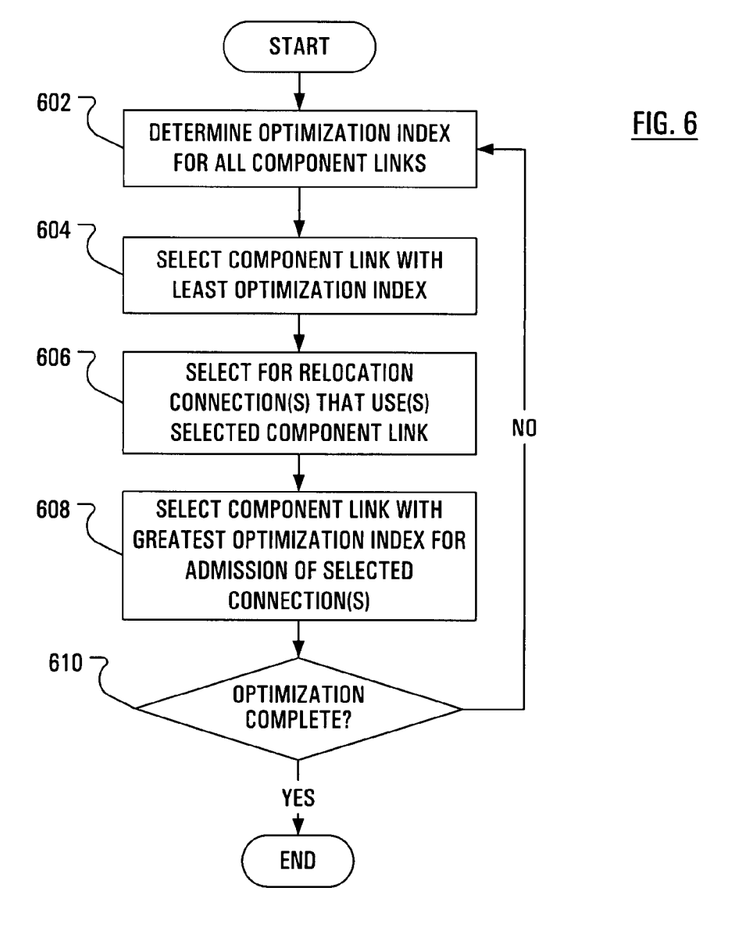
FIG. 6 illustrates steps in a global optimization method according to an embodiment of the present invention.

FIG. 6 illustrates steps in a global optimization method in which the local optimization method presented hereinbefore is adapted to provide a simple, iterative method. Initially, a TE-Optimization-Index may be determined for all component links in the bundled link (step 602). The component link associated with the least TE-Optimization-Index may then be selected (step 604). One or more connections that use the selected component link may then be selected for relocation (step 606). The selected connections may then be relocated (step 608) to the component link associated with the greatest TE-Optimization-Index. That is, the connections selected for relocation may be considered in the algorithm of FIG. 2, where the component link selection (step 212) may be performed with an admission policy wherein the ranking policy considers TE-Optimization-Index. It is then determined whether the global optimization method is complete (step 610). If the global optimization method to be incomplete, the TE-Optimization-Index is determined for all the component links of the bundled link again (step 602) and the rest of the global optimization method is repeated. If it is determined that global optimization of the bundled link is complete, the method is complete.

A more drastic global optimization method may require the sorting of all connections across all component links of a bundled link by respective QoS and resource demands. The connections may then be allocated to the component links in a manner that optimizes an overall network objective (e.g., load balancing or tight packing). Such allocation may be performed irrespective of the component links that carry the connections before the execution of such global optimization. Such a drastic global optimization method may use numerical methods (e.g., linear programming, iterative techniques, or heuristics), the details of which are beyond the scope of the present document.

The execution of the global optimization functions should be properly paced and make-before-break methods should be used to ensure successful connection relocation and minimize service disruption.

The invention is presented in the context of MPLS networks where bundled links are deployed and ordinary TE or DS-TE is performed. However, such a context should not be used to limit the scope of the invention, which can be applied in any connection-oriented packet switched or circuit switched networks such as ATM networks, time division multiplexing networks and MPLS networks that use any layer 2 technologies such as Packet-over-SONET, ATM or Ethernet Link Aggregation. "Layer 2" is the Data Link layer of the commonly-referenced multi-layered communication model, Open Systems Interconnection (OSI).

The traffic balancing, recovery, re-balancing and global optimization mechanisms presented herein are not exclusive to the MPLS protocol and can be adapted to other connection-oriented network protocols, where the resources are partitioned into disjoint subsets.

In networks where bundled links and/or connections are deployed, aspects of the present invention allow load sharing among the component links as well as redundancy in the event that one or more component links in the bundled link fail.

The intelligent traffic balancing mechanisms presented herein offer significant improvement, in terms of achieving high resource utilization, high availability and improved traffic QoS guarantees by balancing both the traffic load and traffic types on a bundled link made up of component links.

The intelligent traffic balancing mechanisms also reduce the number of connections affected by a component link failure, through balancing the number of connections on each component link.

The recovery mechanism proposed herein offers high level of route/path availability and resilience for connections of all class types and rapid recovery for connections with stringent QoS requirements.

The re-balancing mechanism proposed herein provides the capability to achieve a balanced traffic load and traffic types on the bundled link.

The global optimization policy can amplify the above benefits by factoring in bandwidth measures and QoS requirements of all connections while allocating the connections to component links.

Although this foregoing is presented in the context of MPLS networks and protocols wherein bundled links may be deployed, as will be apparent to a person skilled in the art, hereinbefore-presented concepts can be employed whenever resources are partitioned into disjoint subsets. For example, a bundled link can be a bundle of physical links between two routers, different wavelengths inside one or more optical fibers, a set of disjoint time slots in a time division multiple access (TDMA) channel, etc. The connections can be part of any network that has notion of connections (e.g., Ethernet Virtual Local Area Networks, Virtual Private Networks, ATM Virtual Circuits, Frame Relay Data Link Connections, circuit emulation connections, voice/video channels, etc.).

Other modifications will be apparent to those skilled in the art and, therefore, the invention is defined in the claims.

We claim:

1. A method performed at a router of traffic rebalancing after an addition of a given component link to a bundled link that includes a plurality of component links, said method comprising:
    determining an associated optimization index for each of said component links according to an optimization policy, said optimization index indicating a degree of deviation of a value of at least one metric associated with each of said component links from a target value of said at least one metric;
    selecting a candidate component link from among said component links based on said associated optimization index;
    selecting a candidate connection on said candidate component link; and
    relocating said candidate connection to another component link among said component links;
    wherein said selecting said candidate component link based on said associated optimization index comprises selecting said candidate component link as the component link having the lowest optimization index.

2. The method of claim 1 wherein said addition of said given component link occurs as a result of a recovery of said given component link.

3. A method performed at a router of optimizing use of a plurality of component links of a bundled link, said method comprising:
    determining an associated optimization index for each of said component links according to an optimization policy, said optimization index indicating a degree of deviation of a value of at least one metric associated with each of said component links from a target value of said at least one metric;
    selecting a candidate component link from among said component links based on said associated optimization index;
    selecting a candidate connection on said candidate component link; and
    relocating said candidate connection to another component link among said component links;
    wherein said selecting said candidate component link based on said associated optimization index comprises selecting said candidate component link as the component link having the lowest optimization index.

4. The method of claim 3 wherein said determining said associated optimization index for a given one of said component links is based on a measure of utilization of said given one of said component links.

5. The method of claim 3 wherein said relocating comprises:
    selecting a given admission policy from a plurality of admission policies; and selecting a particular component link from said plurality of component links based on said given admission policy.

6. The method of claim 3 wherein said relocating comprises selecting said other component link based on said associated optimization index.

7. A router communicatively connected to a plurality of component links in a bundled link, said router comprising a processor and memory coupled to said processor, said memory containing computer-executable instructions which, when performed by said processor, cause said processor to:
    determine an associated optimization index for each of said component links according to an optimization policy, said optimization index indicating a degree of deviation of a value of at least one metric associated with each of said component links from a target value of said at least one metric;
    select as a candidate component link from among said component links, the component link having the lowest associated optimization index;
    select a candidate connection on said candidate component link; and
    relocate said candidate connection to another component link among said component links.

8. A router communicatively connected to a plurality of component links in a bundled link, said router comprising:
    means for determining an associated optimization index for each of said component links according to an optimization policy, said optimization index indicating a degree of deviation of a value of at least one metric associated with each of said component links from a target value of said at least one metric;
    means for selecting as a candidate component link from among said component links, the component link having the lowest associated optimization index;

means for selecting a candidate connection on said candidate component link; and means for relocating said candidate connection to another component link among said component links.

9. A non-transitory computer readable medium containing computer executable instructions which, when performed by a processor at a router, cause the processor to:

determine an associated optimization index for each of a plurality of component links of a bundled link according to an optimization policy, said optimization index indicating a degree of deviation of a value of at least one metric associated with each of said component links from a target value of said at least one metric;

select as a candidate component link from among said component links, the component link having the lowest associated optimization index;

select a candidate connection on said candidate component link; and relocate said candidate connection to another component link among said component links.

* * * * *